(12) United States Patent
Nomura et al.

(10) Patent No.: US 11,668,075 B2
(45) Date of Patent: Jun. 6, 2023

(54) WORK VEHICLE

(71) Applicant: Komatsu Ltd., Tokyo (JP)

(72) Inventors: Makoto Nomura, Tokyo (JP);
Takanori Yamane, Tokyo (JP); Kaoru Watanabe, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 17/413,659

(22) PCT Filed: Feb. 25, 2020

(86) PCT No.: PCT/JP2020/007386
§ 371 (c)(1),
(2) Date: Jun. 14, 2021

(87) PCT Pub. No.: WO2020/175447
PCT Pub. Date: Sep. 3, 2020

(65) Prior Publication Data
US 2022/0056672 A1 Feb. 24, 2022

(30) Foreign Application Priority Data
Feb. 28, 2019 (JP) .............................. JP2019-036971

(51) Int. Cl.
*E02F 9/26* (2006.01)
*B60K 35/00* (2006.01)
(Continued)

(52) U.S. Cl.
CPC ................ *E02F 9/26* (2013.01); *B60K 35/00* (2013.01); *B60L 1/00* (2013.01); *B60L 3/12* (2013.01); *G09G 3/3406* (2013.01); *B60K 2370/349* (2019.05); *B60K 2370/52* (2019.05); *B60L 53/60* (2019.02); *B60L 2270/30* (2013.01); *B60L 2270/34* (2013.01); *B60L 2270/36* (2013.01);
(Continued)

(58) Field of Classification Search
CPC .......... E02F 9/26; E02F 9/2091; B60K 35/00; B60K 2370/349; B60K 2370/52; B60L 1/00; B60L 3/12; B60L 53/60; B60L 2250/16; B60L 53/14; B60L 3/00; G09G 3/3406; G09G 2320/0626; G09G 2380/10; G09G 5/10; Y02T 90/12; Y02T 10/70; Y02T 10/7072; Y02T 90/14; H02J 7/0048; H02J 7/00
See application file for complete search history.

(56) References Cited

U.S. PATENT DOCUMENTS

2008/0231229 A1    9/2008  Aradachi et al.
2010/0097029 A1*   4/2010  McCabe ............... B60L 50/40
                                                320/103
(Continued)

FOREIGN PATENT DOCUMENTS

CN    101764419 A    6/2010
CN    103857554 A    6/2014
(Continued)

*Primary Examiner* — Douglas M Wilson
(74) *Attorney, Agent, or Firm* — Locke Lord LLP

(57) ABSTRACT

A work vehicle 1 includes a display unit 51 of a rechargeable work vehicle 1, and a display unit controller 53 configured to reduce a brightness of the display unit 51 during charge of the work vehicle 1, compared with that during operation of the work vehicle 1.

9 Claims, 5 Drawing Sheets

(51) Int. Cl.
*B60L 1/00* (2006.01)
*B60L 3/12* (2006.01)
*G09G 3/34* (2006.01)
*B60L 53/60* (2019.01)

(52) U.S. Cl.
CPC . *G09G 2320/0626* (2013.01); *G09G 2380/10* (2013.01)

(56) References Cited

U.S. PATENT DOCUMENTS

| | | | | |
|---|---|---|---|---|
| 2011/0082615 A1* | 4/2011 | Small | ...................... | B60K 37/06 |
| | | | | 715/799 |
| 2011/0082616 A1* | 4/2011 | Small | ................. | G01C 21/3664 |
| | | | | 715/744 |
| 2011/0082619 A1* | 4/2011 | Small | .................. | G06F 3/04886 |
| | | | | 701/31.4 |
| 2014/0232355 A1 | 8/2014 | Masuda et al. | | |
| 2019/0299803 A1* | 10/2019 | Cheng | ..................... | B60L 53/16 |

FOREIGN PATENT DOCUMENTS

| | | | |
|---|---|---|---|
| GB | 2466561 A | | 6/2010 |
| JP | 2001-016793 A | | 1/2001 |
| JP | 2001016793 A | * | 1/2001 |
| JP | 2002-104020 A | | 4/2002 |
| JP | 2005-128094 A | | 5/2005 |
| JP | 2007-288894 A | | 11/2007 |
| JP | 2008-236880 A | | 10/2008 |
| JP | 2009-177938 A | | 8/2009 |
| JP | 2010-149553 A | | 7/2010 |
| JP | 2010-168745 A | | 8/2010 |
| JP | 2013-59198 A | | 3/2013 |

* cited by examiner

WORK VEHICLE

FIELD

The present invention relates to a work vehicle.

BACKGROUND

For example, some work vehicles such as excavators are driven by power supplied from a rechargeable battery. In such a rechargeable work vehicle, it is desired that an operator can easily confirm the remaining battery capacity. A work vehicle state display device that displays the remaining battery capacity and a connection state of a power cable is known (see, e.g., Patent Literature 1).

CITATION LIST

Patent Literature

Patent Literature 1: JP 2007-288894 A

SUMMARY

Technical Problem

In some cases, the rechargeable work vehicle is charged on a site without people, at night after work. In such a case, if the display device is lit bright during charge, the presence of the work vehicle on the site without people is more likely to be known by a third party. This may cause undesirable mischievous operations or theft of the work vehicle by the third party.

An object of the present invention is to provide a rechargeable work vehicle that can reduce the brightness of a display unit during charge of the work vehicle, compared with that during operation of the work vehicle.

Solution to Problem

According to an aspect of the present invention, a work vehicle comprises: a display unit of a rechargeable work vehicle and a display control unit configured to reduce a brightness of the display unit during charge of the work vehicle, compared with that during operation of the work vehicle.

Advantageous Effects of Invention

According to the present invention, the display control unit can reduce the brightness of the display unit during charge of the rechargeable work vehicle, compared with that during operation of the work vehicle.

BRIEF DESCRIPTION OF DRAWINGS

FIG. 4 is a diagram illustrating a state of a display device of the work vehicle in which backlight is turned on.

DESCRIPTION OF EMBODIMENTS

Hereinafter, embodiments of the present invention will be described with reference to the accompanying drawings, but the present invention is not limited thereto. Component elements according to the embodiments described below can be appropriately combined with each other. Furthermore, in some cases, some of the component elements are not used.

[Work Vehicle]

Figure 1:
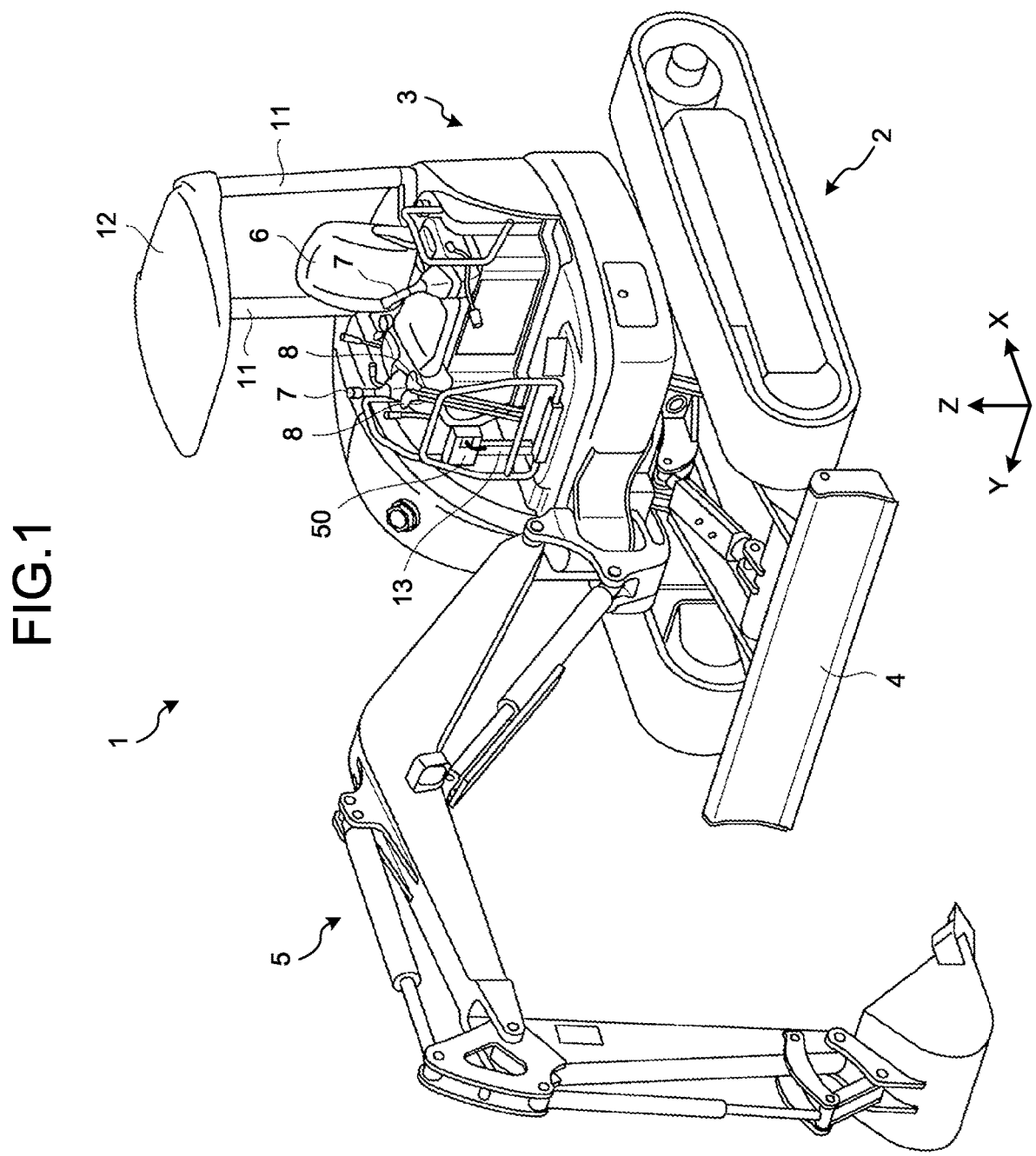
FIG. 1 is a perspective view of a work vehicle according to the present embodiment.
Figure 2:
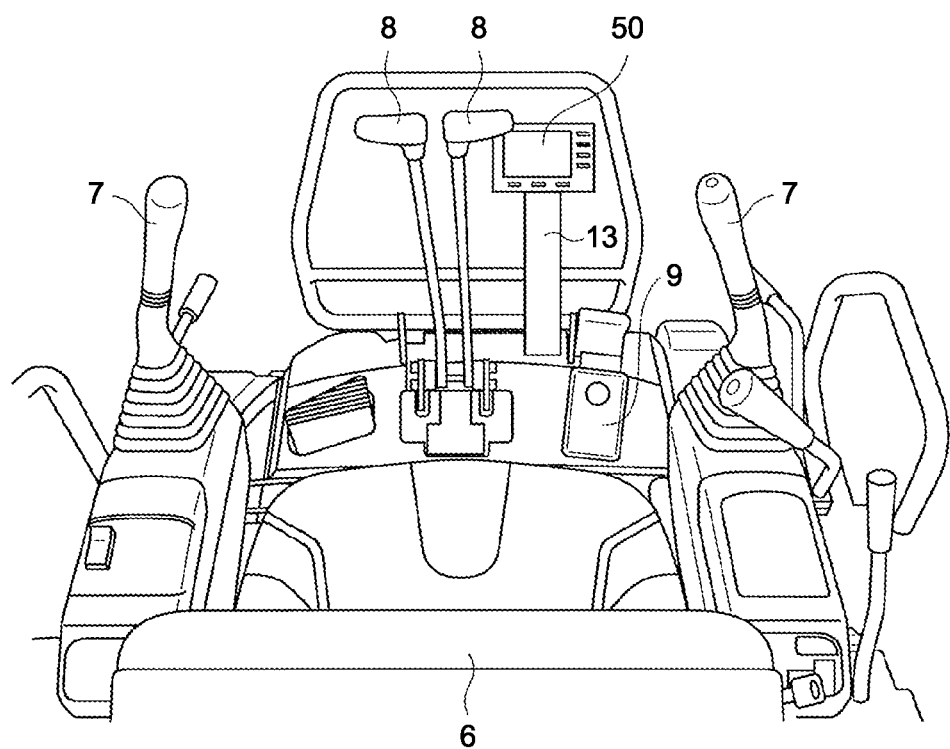
FIG. 2 is a perspective view of the work vehicle as viewed from the side of an operator seat to the front side.
Figure 3:
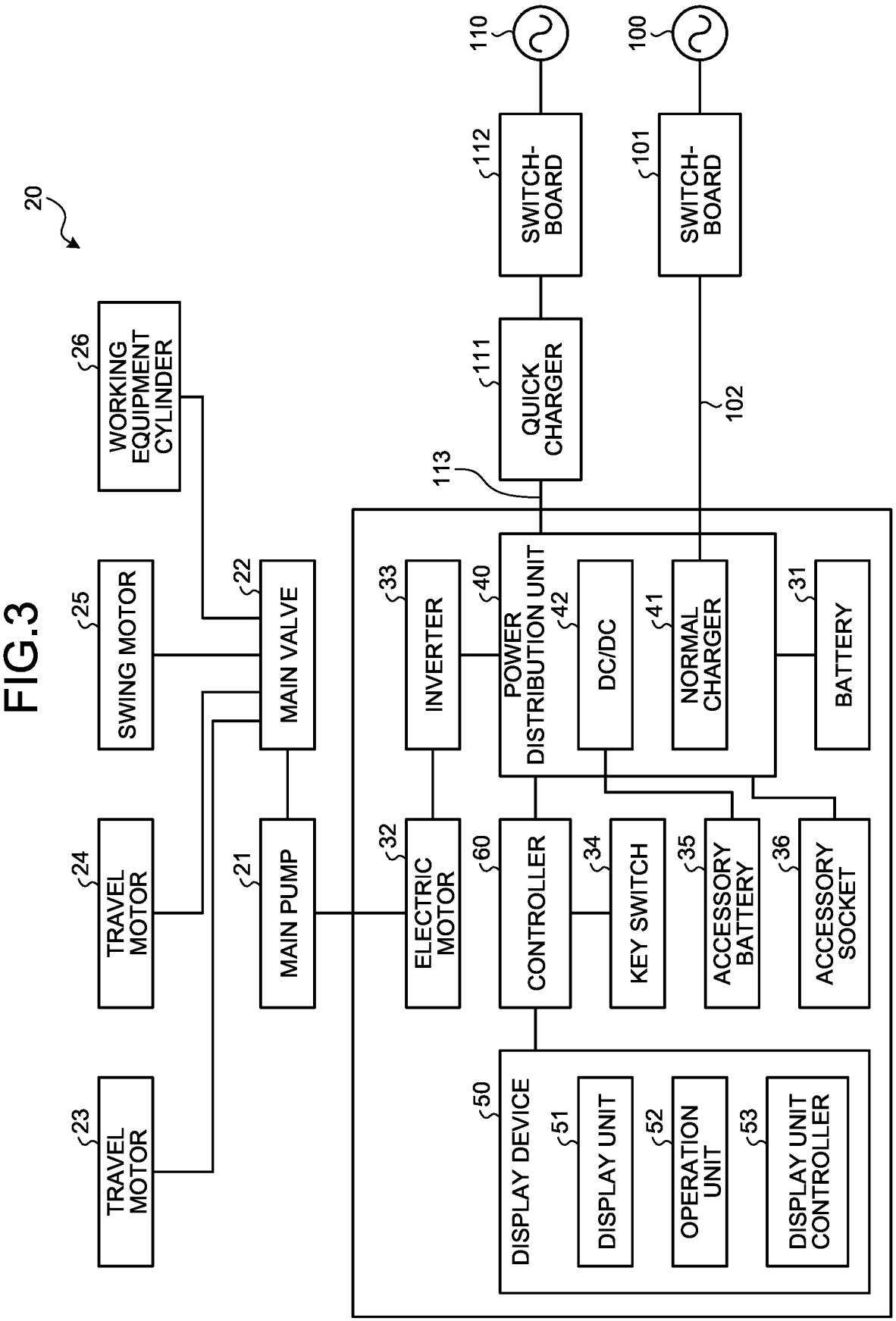
FIG. 3 is a block diagram illustrating a control device of the work vehicle.

FIG. 1 is a perspective view of a work vehicle 1 according to the present embodiment. FIG. 2 is a perspective view of the work vehicle 1 as viewed from the side of an operator seat to the front side. FIG. 3 is a block diagram illustrating a control device of the work vehicle 1. The work vehicle 1 has a storage battery that is a rechargeable electrical storage device, such as a battery 31, and is driven by power supplied from the battery 31. In the present embodiment, the work vehicle 1 is a small excavator. In the following description, the work vehicle 1 is appropriately referred to as an excavator 1. The work vehicle 1 is a rechargeable work vehicle.

The excavator 1 includes an undercarriage 2 including tracks, an upper swing body 3, a blade 4, and working equipment 5. The upper swing body 3 is swingably arranged above the undercarriage 2. The blade 4 is arranged in front of the undercarriage 2 in a liftable manner. The blade 4 is configured to be lifted by a hydraulic actuator. The working equipment 5 is arranged in front of the upper swing body 3. The working equipment 5 has a boom, an arm, and a bucket. The working equipment 5 performs excavation work and the like by driving the boom, the arm, and the bucket by individual hydraulic actuators. Note that the excavator may be an excavator with no blade.

An operator seat 6, a working equipment lever 7, a travel lever 8, and an operation pedal 9 for boom swing are arranged on the upper swing body 3. The working equipment levers 7 are arranged on the left and right sides of the operator seat 6. A pair of the travel levers 8 and the operation pedal 9 for boom swing are arranged in front of the operator seat 6. Note that the excavator may be an excavator with no boom swing or operation pedal 9.

The excavator 1 has, for example, a canopy specification. Above the operator seat 6, a roof 12 that is supported by two posts 11 standing on the upper swing body 3 is arranged. On a side of the pair of the travel levers 8, a display device 50 that is supported by a support arm 13 standing on a floor is arranged. The position of the display device 50 illustrated in FIG. 2 is an example and may be arranged at a console on the right side of the operator seat 6. The display device 50 is provided within a range that can be visually recognized by the operator. The display device 50 will be described later.

[Hydraulic System of Work Vehicle]

The excavator 1 has a hydraulic system 20 configured to drive the excavator 1, on the upper swing body 3. The hydraulic system 20 drives the undercarriage 2, the upper swing body 3, and the working equipment 5. The hydraulic system 20 has a main pump 21 that is driven by a driving force generated by an electric motor 32 provided in the upper swing body 3, a main valve 22 that is connected to the main pump 21 via a flow path, and a travel motor 23, a travel motor 24, a swing motor 25, and a working equipment cylinder 26 that are driven on the basis of hydraulic oil supplied from the main pump 21. The excavator is an electric excavator.

The main pump 21 is a power source for the travel motor 23, the travel motor 24, the swing motor 25, and the working equipment cylinder 26. The main pump 21 is connected to an output shaft of the electric motor 32 and operated by the driving force generated by the electric motor 32.

The travel motor 23 and the travel motor 24 are motors for traveling the excavator 1. The travel motor 23 operates one of the tracks of the undercarriage 2. The travel motor 24 operates the other of the tracks of the undercarriage 2. The excavator 1 travels by driving the travel motor 23 and the travel motor 24.

The swing motor 25 is a motor configured to swing the upper swing body 3. Driving of the swing motor 25 swings the upper swing body 3.

The working equipment cylinder 26 is a hydraulic cylinder configured to operate the working equipment 5. The working equipment cylinder 26 expands and contracts on the basis of the flow rate of the hydraulic oil. The working equipment 5 is operated by the expansion and contraction of the working equipment cylinder 26.

[Electrical System of Work Vehicle]

The electric motor 32 is driven by power supplied from the battery 31. The undercarriage 2, the upper swing body 3, and the working equipment 5 are driven via the hydraulic system 20. The excavator 1 includes, in the upper swing body 3, the battery 31, the electric motor 32, an inverter 33 configured to supply power to the electric motor 32, a 12 V or 24 V accessory battery 35 configured to supply power to each of a power distribution unit 40, a controller 60, the display device 50, and the inverter 33, and the power distribution unit 40.

The battery 31 supplies power required to drive the excavator 1. In other words, the battery 31 is a high-voltage drive battery. The battery 31 has a higher voltage than that of the accessory battery 35. The battery 31 is rechargeable repeatedly and is charged, for example, at night. The battery 31 is controlled in charge and discharge by the power distribution unit 40.

The electric motor 32 generates the driving force for driving the main pump 21. The electric motor 32 is driven by power output from the inverter 33. The main pump 21 is connected to the output shaft of the electric motor 32.

The inverter 33 converts DC voltage output from the battery 31 via the power distribution unit 40 into AC voltage and outputs the AC voltage to the electric motor 32.

The power distribution unit 40 has a switch such as a contactor which is not illustrated. The power distribution unit 40 opens and closes the switch by a control signal from the controller 60 and controls charge and discharge of the battery 31. During charge, the power distribution unit 40 supplies power to the battery 31 from a charger to charge the battery 31. In discharging, power is supplied from the battery 31 to the electric motor 32 via the inverter.

[Charge of Work Vehicle]

Normal charge by a charger, for example, a normal charger 41 that is a charging unit mounted in the vehicle body, and quick charge by a quick charger 111 that is installed outside the vehicle are available for the excavator 1. Note that the quick charger 111 may be provided in the vehicle.

The normal charger 41 performs normal charge for the battery 31. The normal charger 41 is included in the power distribution unit 40. Note that the normal charger 41 may not be included in the power distribution unit 40 but may be provided in the vehicle. Furthermore, the normal charger 41 may be provided outside the vehicle. When a normal charging connector of a normal charging cable 102, which is not illustrated, is connected to a normal charging inlet, which is not illustrated, the normal charger 41 is connected to a switchboard 101 and a commercial power supply 100. The switchboard 101 distributes single-phase 200 V power that is input from the commercial power supply 100 and supplies part of the power to the normal charger 41 via the normal charging cable 102. The normal charger 41 converts the input single-phase 200 V AC power into DC power suitable for the normal charge. The normal charger 41 charges the battery 31.

When the controller 60 detects that the normal charging connector of the normal charging cable 102 is connected to the normal charging inlet that is a connection port of the normal charger 41, the controller 60 activates the normal charger 41 and controls to start the normal charge from the normal charger 41 to the battery 31. Note that the normal charge may be started by operating a switch which is not illustrated by the operator. When the normal charge is started, the controller 60 is brought into a normal charge mode. When a key switch 34 is turned on during the normal charge mode, the excavator 1 can use an accessory such as a working light or accessory socket 36. The controller 60 stops charging when detecting removal of the normal charging connector of the normal charging cable 102 from the normal charging inlet of the normal charger 41, charge of the battery 31 to a predetermined amount, for example, full charge of the battery 31, or occurrence of abnormality during charge, or when the operator turns off charging. Note that the charging may be stopped when the predetermined charging time has passed. Devices such as the controller 60 and the display device 50 that have been activated during charge are shut down, for example, after a certain period of time has passed after the charging is stopped. Note that the shutdown may be performed before passage of the certain period of time. Note that the accessory socket 36 is a power supply port, and the output voltage thereof may have a general commercial power supply voltage or the same voltage as the accessory battery. Note that the output voltage may be any voltage.

The quick charger 111 quickly charges the battery 31. The quick charger 111 has, for example, an operation switch, not illustrated, which is configured to receive start operation and stop operation of the quick charge. When a quick charging connector, not illustrated, of a quick charging cable 113 is connected to a quick charging inlet, not illustrated, of the excavator 1 and the start operation of the quick charge is received by the quick charging connector, the quick charger 111 is connected to a switchboard 112 and a commercial power supply 110. The switchboard 112 supplies three-phase 200 V power input from the commercial power supply 110 to the quick charger 111. The quick charger 111 converts the input three-phase 200 V AC power into DC power suitable for the quick charge. The quick charger 111 charges the battery 31.

When the controller 60 detects reception of the start operation of the quick charge, while the quick charge connector of the quick charging cable 113 is connected to the quick charge inlet of the excavator 1, the controller 60 starts quick charge from the quick charger 111 to the battery 31. When the quick charge is started, the controller 60 is brought into a quick charge mode. When the key switch 34 is turned on during the quick charge mode, the excavator 1 can use the accessory such as the working light or the accessory socket 36. When the controller 60 detects reception of the stop operation of the quick charge, passage of the predetermined charging time, or the abnormality during charge, the controller 60 stops the quick charge. Alternatively, when the battery 31 is charged to the predetermined amount, for example, full charge of the battery 31, charging may be stopped. Devices such as the controller 60 and the display device 50 that have been activated during charge are shut down, for example, after a certain period of time has passed after the charging is stopped. Note that the shutdown may be performed before passage of the certain period of time.

[Control System of Work Vehicle]

The excavator 1 is controlled by, for example, the controller 60. The key switch 34, the power distribution unit 40, and the display device 50 are connected to the controller 60. For example, operation amounts are input to the controller 60 from the working equipment levers 7, the travel levers 8, or the like. For example, a plurality of sensors, not illustrated, which detects a value of current flowing through the electric motor 32, the voltage or temperature of the battery 31, the temperature of hydraulic oil, and the like, is connected to the controller 60. The controller 60 operates the electric motor 32 via the power distribution unit 40, on the basis of the operation amounts of the operation levers, such as the working equipment levers 7 or the travel levers 8, detection values detected by the sensors, and the like, and controls the drive of the main pump 21. A hydraulic source from the main pump 21 causes the undercarriage 2 to travel, the upper swing body 3 to swing, or the working equipment 5 or the like to operate according to an operation amount of each operation lever. Note that each operation lever may have an electric operation lever that outputs an operation amount as an electric signal, or may have a hydraulic operation lever. Note that the hydraulic operation lever may drive the valve according to operation to supply oil from the main pump 21 to the travel motor 23, the travel motor 24, the swing motor 25, or the working equipment cylinder 26.

When the key switch 34 is turned on while the charging connectors are not connected to the charging inlets, the controller 60 is brought into an operation mode. When the key switch 34 is turned on, power is supplied from the accessory battery 35 to the controller 60, the power distribution unit 40, and the display device 50. Furthermore, when the key switch 34 is turned on, power is supplied from the accessory battery 35 to a working light which is not illustrated, the accessory socket 36, and the like. Furthermore, when the key switch is further turned to a position different from an on-position while the controller 60 is in the operation mode, the electric motor can be started. When the key switch 34 is turned off, the power supply from the accessory battery 35 to electronic devices such as the controller 60 and the power distribution unit 40, the working light which is not illustrated, the accessory sockets 36, and the like is stopped, and the controller 60, the display device 50, and the like are shut down. Note that the accessory battery 35 is charged from the battery 31 via a DC/DC converter 42.

[Display Device of Work Vehicle]

Figure 4:
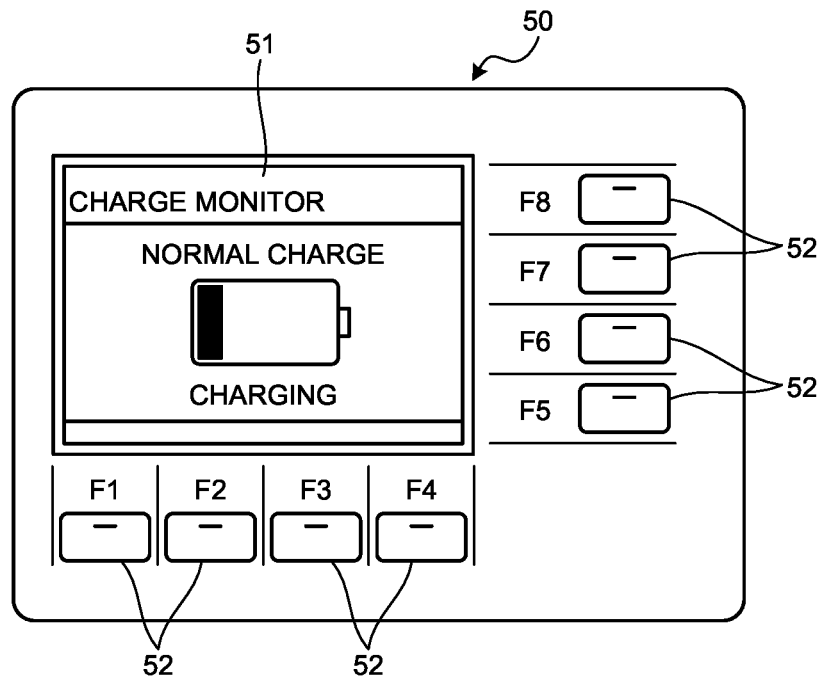
Figure 5:
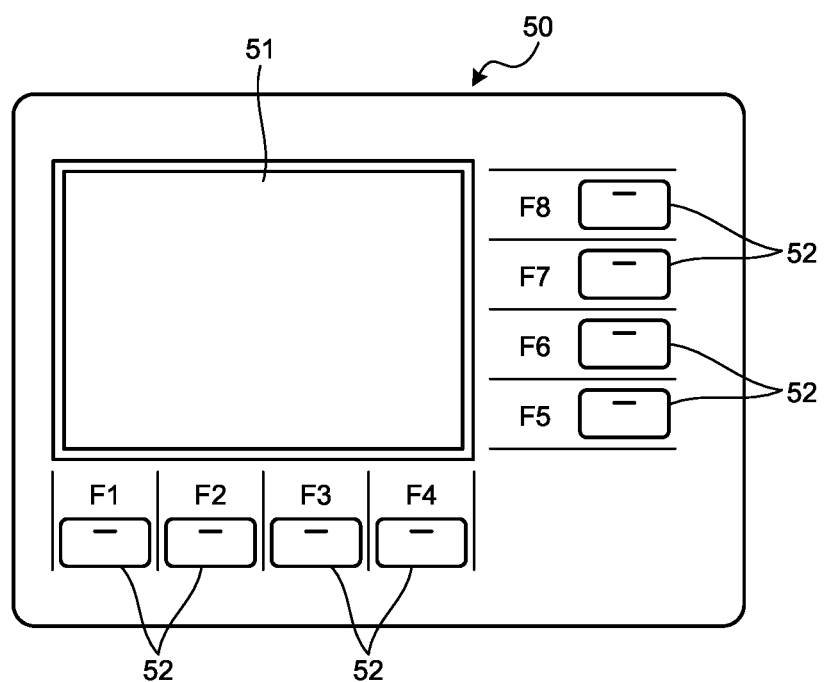
FIG. 5 is a diagram illustrating a state of the display device of the work vehicle in which the backlight is turned off.

FIG. 4 is a diagram illustrating, for example, a state of the display device 50 of the work vehicle 1 in which backlight is turned on. FIG. 5 is a diagram illustrating, for example, a state of the display device 50 of the work vehicle 1 in which the backlight is turned off. The display device 50 is achieved by using an organic EL screen, liquid crystal display screen, or the like. The display device 50 has a display unit 51 as a display screen configured to display various information including operation information of the excavator 1, an operation unit 52 into which various instructions or information are input by the operator, and a display unit controller (display control unit) 53 that is achieved by a CPU or the like and is configured to control the display device 50. When the controller 60 is in the operation mode, the normal charge mode, or the quick charge mode, power is supplied to the display device 50. Note that the operation unit 52 may be provided at a location different from the display device 50, for example, in the console, and the display unit controller (display control unit) 53 may be provided at a location different from the display device 50, for example, in the controller 60.

When the excavator 1 is in operation, the display unit 51 always turns on the backlight and displays the operation information. The operation information includes, for example, a service meter that indicates an accumulated operation time, operation information about the battery, such as battery temperature and remaining battery capacity, a hydraulic oil thermometer, a traveling speed monitor, an electric system warning monitor, the current time, and the like. The operation information can be acquired from the controller 60, as detection values detected by the sensors.

The display unit 51 displays charge information during charge of the excavator 1. The charge information includes, for example, the remaining battery capacity, a time related to charging, information indicating normal charging or quick charging, information indicating the progress of charging, and the like. The charge information is obtainable from the controller 60. Furthermore, the operator can operate the operation unit 52 to display detailed information, such as the voltage and temperature of each battery 31 or the remaining charging time, for confirmation.

Note that "during charge" may include not only a time in which charge is actually performed but also a time in which each of the charging connectors is connected to each of the charging inlets. Furthermore, "during charge" may include a time from the finish of charge after removal of each charging connector from each charging inlet to the shutdown. In other words, "during charge" may include the whole time other than a time of work of the working equipment 5 or the like of the excavator 1 operated by the operator.

The operation unit 52 includes, for example, operation switches F1 to F8 which are function switches arranged on the lower side and the right side of the display unit 51. The operation switches F1 to F8 are switches each configured to input a signal corresponding to a guide icon, which is not illustrated, displayed on the display unit 51. The operation unit 52 may be a touch panel arranged on the liquid crystal display.

The display unit 51 and the operation unit 52 are connected to the display unit controller 53. When detecting an operation on the operation unit 52, the display unit controller 53 controls acquisition of operation information and output of the operation information to the controller 60. During operation of the excavator 1, the display unit controller 53 controls the display unit 51 to display the operation information acquired via the controller 60. During charge of the excavator 1, the display unit controller 53 controls the display unit 51 to display the charge information acquired from the controller 60.

During charge of the excavator 1, the display unit controller 53 controls the brightness of the backlight of the display unit 51 to be adjusted. During the charge of the excavator 1, the display unit controller 53 turns on the backlight to increase the brightness of the display unit 51, as illustrated in FIG. 4, when a lighting condition of the backlight is satisfied. During the charge of the excavator 1, the display unit controller 53 turns off the backlight to reduce the brightness of the display unit 51, as illustrated in FIG. 5, when the lighting condition of the backlight is not satisfied. When the lighting condition is not satisfied, the charge information is hidden. Note that when the lighting condition is satisfied, the brightness of the backlight is increased as compared with that in the case where the lighting condition is not satisfied. When the lighting condition is not satisfied, the brightness of the backlight is reduced compared with that in the case where the lighting condition is satisfied. Note that "reduce the brightness of the backlight" may include turning off the backlight.

When the excavator 1 is under the control of the operator, it may be determined that the lighting condition is satisfied.

For example, when an elapsed time from the start of charging is equal to or less than a predetermined time, for example, equal to or less than one minute, it is determined that the lighting condition is satisfied. When the elapsed time from the start of charging is equal to or less than the predetermined time, the operator stays in the vicinity of the excavator 1 and is highly likely to check the display unit 51, and the excavator is under the control of the operator.

For example, when the operation information indicates that an elapsed time from the operation on the operation unit 52 is equal to or less than a predetermined time, for example, one minute or less, it is determined that the lighting condition is satisfied. When the elapsed time from the operation on the operation unit 52 is equal to or less than the predetermined time, the operator is in the vicinity of the excavator 1 and is highly likely to check the operations of the operation levers or check the display unit 51, and the excavator is under the control of the operator.

For example, when the control signal acquired from the controller 60 indicates that the key switch 34 is turned on, it is determined that the lighting condition is satisfied. When the key switch 34 is turned on, the operator is working around the excavator 1 and the excavator 1 is highly likely to be under the control of the operator. For example, when a content to be checked that is displayed on the display unit 51 is waiting for the operator's operation, it is determined that the lighting condition is satisfied. Furthermore, when there is information as a positive notice to the operator, it may be determined that the lighting condition is satisfied.

For example, when the charge information indicates that charge is completed, it is determined that the lighting condition is satisfied. When charge is completed, information indicating that charge is completed may be output. Preferably, the information indicating that charge is completed may be displayed on the display unit 51. Furthermore, the lighting condition may be determined to be satisfied, until a predetermined time passes after the completion of the charge.

For example, when an abnormality occurs in charging, it is determined that the lighting condition is satisfied. When the abnormality occurs in charging, information indicating occurrence of the abnormality in charging may be output. Preferably, the information indicating that charge is completed may be displayed on the display unit 51. Furthermore, the lighting condition may be determined to be satisfied, until a predetermined time passes after the occurrence of the abnormality.

If none of the above applies, it is not determined that the lighting condition is satisfied. In such a case, it is preferable to turn off the backlight, reduce the brightness of the display unit 51, and reduce the possibility that the existence of the excavator 1 will be known to the third party.

[Process in Display Device]

Figure 6:
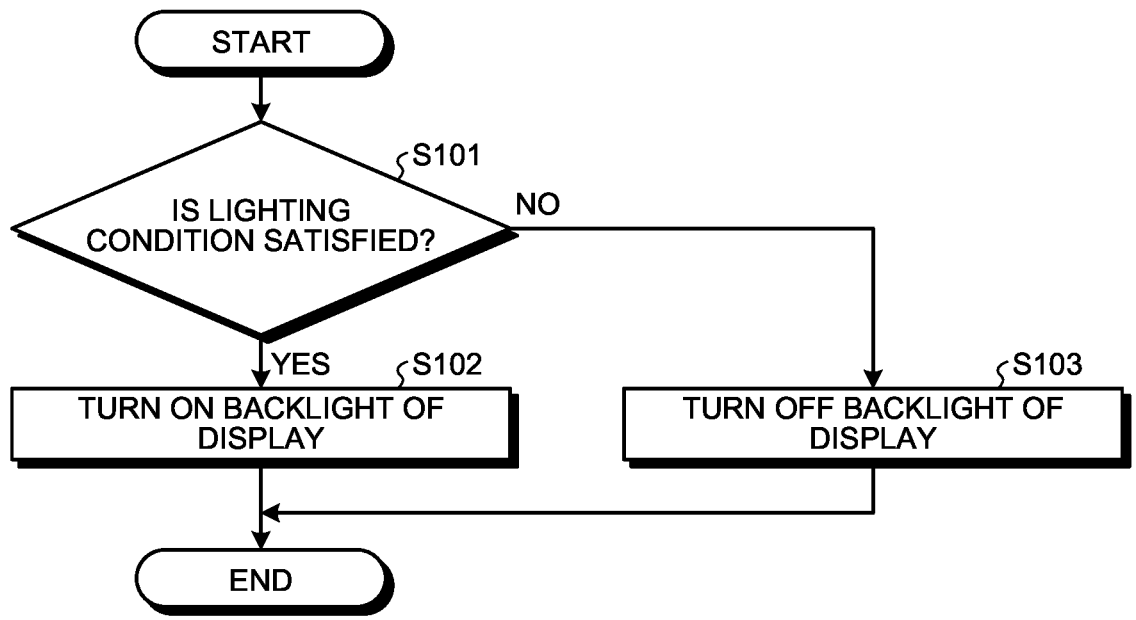
FIG. 6 is a flowchart illustrating a procedure of a process performed by the display device.

A process performed by the display unit controller 53 of the display device 50 during the charge of the excavator 1 will be described. FIG. 6 is a flowchart illustrating a procedure of the process performed by the display device 50. During charge of the excavator 1, in other words, when the excavator 1 is in the normal charge mode or the quick charge mode, the process illustrated in FIG. 6 is performed. The display unit controller 53 determines whether the lighting condition of the display unit 51 is satisfied (Step S101).

If the display unit controller 53 determines that the lighting condition of the display unit 51 is satisfied (Yes in Step S101), the process proceeds to Step S102. If the display unit controller 53 determines that the lighting condition of the display unit 51 is not satisfied (No in Step S101), the process proceeds to Step S103.

If it is determined that the lighting condition of the display unit 51 is satisfied (Yes in Step S101), the display unit controller 53 brings the backlight of the display unit 51 into a turned-on state (Step S102). As illustrated in FIG. 4, when the backlight is turned on, the charge information is displayed on the display unit 51. The charge information displayed on the display unit 51 enables the operator to confirm the remaining battery capacity, the information indicating the normal charging or quick charging, and the like.

If it is determined that the lighting condition of the display unit 51 is not satisfied (No in Step S101), the display unit controller 53 brings the backlight of the display unit 51 into a turned-off state (Step S103). As illustrated in FIG. 5, when the backlight of the display unit 51 is turned off, it is more difficult to visually recognize the charge information than when the backlight is turned on. The charge information becomes hidden. This reduces the possibility that the existence of the excavator 1 will be known to the third party.

The steps of the process are performed repeatedly during the charge of the excavator 1. In a case where the backlight of the display unit 51 is turned off when the operator desires to check the remaining battery capacity, any operation on the operation unit 52 by the operator turns on the backlight of the display unit 51, enabling confirmation of the remaining battery capacity.

[Computer System]

Figure 7:
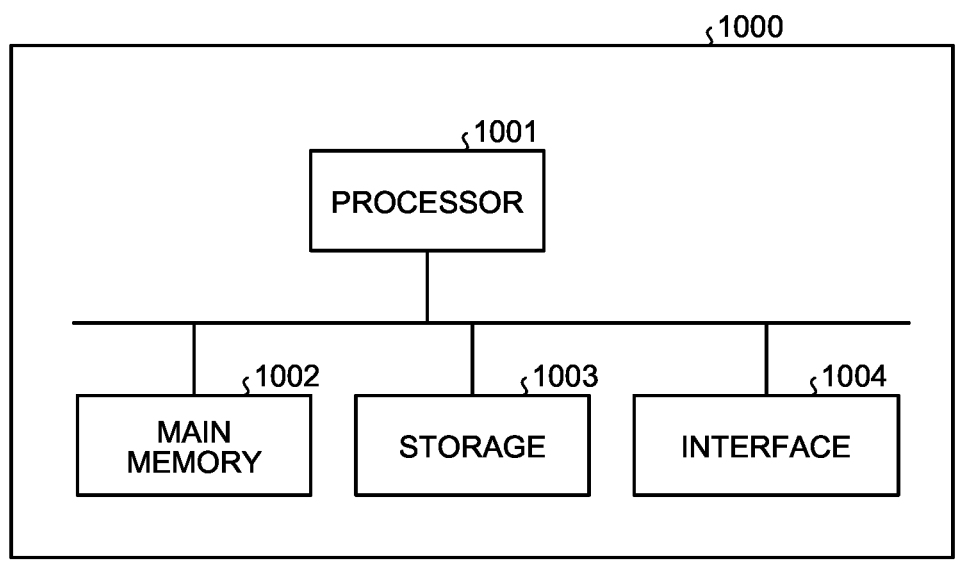
FIG. 7 is a block diagram illustrating a computer system according to the present embodiment.

FIG. 7 is a block diagram illustrating an example of a computer system 1000. The controller 60 described above includes the computer system 1000. The computer system 1000 includes a processor 1001 such as a central processing unit (CPU), a main memory 1002 that includes a nonvolatile memory such as a read only memory (ROM) and a volatile memory such as a random access memory (RAM), a storage 1003, and an interface 1004 that includes an input/output circuit. The functions of the controller 60 described above are stored, as programs, in the storage 1003. The processor 1001 reads a program from the storage 1003, loads the program in the main memory 1002, and executes the process described above according to the program. Note that the program may be delivered to the computer system 1000 via a network.

[Effects]

In the present embodiment, during the charge of the excavator 1, the display unit controller 53 turns off the backlight of the display unit 51. In the present embodiment, the brightness of the display unit 51 can be appropriately controlled during the charge of the excavator 1. As described above, according to the present embodiment, when the excavator 1 is charged on the site without people, at night after work, the backlight of the display unit 51 is turned off, and the possibility that the existence of the excavator 1 will be known to the third party can be reduced. According to the present embodiment, the possibility of undesirable mischievous operations or theft of the excavator 1 by the third party can be reduced. Furthermore, turning off of the backlight of the display unit 51 can reduce the power consumption of the accessory battery 35 and further the battery 31. Furthermore, in a work vehicle without a cab, the light of the display unit leaks more out of the vehicle, but according to the present embodiment, the possibility that the existence of the work vehicle is known to the third party can be further reduced. Note that the work vehicle operates indoors and outdoors and is charged at the corresponding operating location. When the work vehicle is charged outdoors, the possibility that the presence of the excavator 1 will be known to the third party can be further reduced.

Furthermore, in the present embodiment, when the display unit 51 is in a state of displaying during the charge of the excavator 1, the display unit controller 53 turns on the backlight of the display unit 51. According to the present embodiment, when there is information that is desired to be displayed on the display unit 51 for notice to the operator, the display unit 51 can display the information.

For example, when the elapsed time from the start of charging the excavator 1 is equal to or less than the predetermined time, the display unit controller 53 turns on the backlight of the display unit 51. According to the present embodiment, the display unit 51 can display the information, when the operator is in the vicinity of the excavator 1 immediately after the start of charging and the operator is highly likely to confirm the display unit 51.

For example, when the elapsed time from the operation on the operation unit 52 is less than or equal to the predetermined time, the display unit controller 53 turns on the backlight of the display unit 51. According to the present embodiment, the display unit 51 can display the information, when the operator is in the vicinity of the excavator 1 immediately after the operator's operation and the operator is highly likely to confirm the display unit 51.

For example, when the key switch 34 is turned on to use the accessory such as the working light or the accessory socket 36 during charge, the display unit controller 53 turns on the backlight of the display unit 51. According to the present embodiment, the display unit 51 can display the information, when the operator is working around the excavator 1 and the excavator 1 is highly likely to be under the control of the operator. Moreover, when the operator leaves the excavator 1 while the key switch 34 is turned on, the backlight of the display unit 51 remains on, which can prevent the operator from forgetting to remove the key.

For example, the display unit controller 53 turns on the backlight of the display unit 51 until the predetermined time passes after the charge of the excavator 1 is completed. According to the present embodiment, the display unit 51 can display the information indicating that charge is completed, when charge is completed. When the operator intends to use the vehicle after completion of the charge, while staying near the vehicle, display of the display unit 51 makes it easier to give notice to the operator of completion of the charge.

For example, the display unit controller 53 turns on the backlight of the display unit 51 until the predetermined time passes after occurrence of the abnormality in charging the excavator 1. According to the present embodiment, the display unit 51 can display the information indicating that the abnormality occurs in charging, when the abnormality occurs in charging. When the operator stays near the vehicle, the operator can promptly handle an abnormal situation due to the display of the display unit 51.

In the above description, turning off of the backlight to adjust the brightness of the display unit 51 has been described, but the backlight may be reduced in brightness and dimmed. For example, when the backlight is reduced in brightness and dimmed to the extent that the information displayed on the display unit 51 can be confirmed within a range of approximately 1 m from the display unit 51 and the information displayed on the display unit 51 cannot be confirmed within a range of approximately several meters from the display unit 51, the operator in the vicinity of the excavator 1 can confirm the display of the display unit 51, but the third party away from the excavator 1 is unlikely to find out the turning on of the display unit 51.

In the above description, the backlight is brought into the turned-off state from the turned-on state, but the backlight may be gradually reduced in brightness and then turned off. For example, before turning off the backlight, the backlight is reduced in brightness and remains in such a state for a predetermined time. When an operation is performed on the operation unit 52 while the backlight remains reduced in brightness, the backlight is returned to the turned-on state. When no operation is performed on the operation unit 52 while the backlight remains reduced in brightness, the backlight is turned off. This configuration makes it possible to prevent the backlight of the display unit 51 from being turned off unexpectedly for the operator.

Note that in order to switch the backlight between the turned-on state and the turned-off state, an operation button for forcibly turning on/off the backlight may be provided in the operation unit 52, the console of the vehicle, or the like. Furthermore, in the process illustrated in FIG. 6, the backlight of the display unit 51 may be configured to be brought into the turned-off state, regardless of or in priority to the result of determination about the lighting condition, when an off button is pressed. Therefore, the backlight of the display unit 51 can be forcibly turned off according to the operator's will.

The excavator 1 is not limited to the excavator with the canopy specification, but can also be applied to an excavator with a cabin specification in which a cab having windows and doors is mounted.

Furthermore, in the embodiments described above, the excavator 1 has been described as an example of the work vehicle, but the present embodiment may be applied to another work vehicle other than the excavator 1, such as a medium-sized or large-sized excavator, wheel loader, or bulldozer. Note that the work vehicle has a travel unit and working equipment such as a bucket or blade.

Note that in the embodiment of charging, the two types of available charging methods of the normal charge and the quick charge are described, but the present invention is not limited to this description. For example, one charging method or only one charging inlet may be employed. Furthermore, for the power supply, the single-phase 200 V for the normal charge and the three-phase 200 V for the quick charge are described above, but the present invention is not limited to this description.

In the above description, the display unit controller 53 and the controller 60 are separated from each other, but the present invention is not limited thereto. The display unit controller 53 and the controller 60 may be integrated with each other.

In the above description, it is assumed that the key switch 34 is turned on after being inserted into a slot and turned, but the present invention is not limited to this description. For example, a device that includes a built-in electronic chip and is configured to be held by the operator may be employed, and when the operator performs a predetermined operation within a certain range from the vehicle, the predetermined operation is determined as an on operation.

Note that the work vehicle may be a work vehicle in which the working equipment, the travel motor, and the swing motor may be driven by an electric actuator. In this case, power is supplied from the battery 31. The work vehicle is an electric work vehicle.

Note that the brightness of the display unit may be adjusted not by turning on or turning off the backlight. The brightness may be adjusted by adjusting the brightness, saturation, hue, or the like of the screen. For example, the display screen may be set to a color that is darker than a color displayed on the screen during work other than during charge. It is preferable to set the entire display screen to black color. Furthermore, the brightness of the display unit may be adjusted by a combination of these. Even in such a case, the brightness of the display unit can be reduced as compared with that during the operation of the work vehicle.

Note that in the present embodiment, a lighting condition determination unit, which is not illustrated, for determining the lighting condition is described, but the lighting condition determination unit may not be provided. In this case, the backlight may be turned off depending on whether the excavator is charged or depending on the state of the operation button for turning on/off the backlight. Furthermore, the brightness of the display unit may be adjusted by a combination of these. Note that the lighting condition determination unit may be located in either of the display unit controller 53 and the controller 60, or may be provided in both thereof.

REFERENCE SIGNS LIST

1 EXCAVATOR (WORK VEHICLE)
2 UNDERCARRIAGE
3 UPPER SWING BODY
4 BLADE
5 WORKING EQUIPMENT
6 OPERATOR SEAT
7 WORKING EQUIPMENT LEVER
8 TRAVEL LEVER
9 OPERATION PEDAL
11 POST
12 ROOF
13 SUPPORT ARM
21 MAIN PUMP
22 MAIN VALVE
23 TRAVEL MOTOR
24 TRAVEL MOTOR
25 SWING MOTOR
26 WORKING EQUIPMENT CYLINDER
31 BATTERY
32 ELECTRIC MOTOR
33 INVERTER
34 KEY SWITCH
40 POWER DISTRIBUTION UNIT
41 NORMAL CHARGER
50 DISPLAY DEVICE
51 DISPLAY UNIT
52 OPERATION UNIT
53 DISPLAY UNIT CONTROLLER (DISPLAY CONTROL UNIT)
60 CONTROLLER
111 QUICK CHARGER

The invention claimed is:

1. A rechargeable work vehicle including working equipment, the work vehicle comprising:
a display unit configured to display charge information during charge of the work vehicle and
a display control unit configured to control a brightness of the display unit to be adjusted, wherein
the display control unit reduces the brightness of the display unit during charge of the work vehicle, compared with that during operation of the work vehicle, and
when a key switch is turned on during charge of the work vehicle,
the display control unit increases the brightness of the display unit that has a brightness reduced as compared with that during the operation of the work vehicle,
wherein the key switch is configured to be further turned to a position different from an on-position so an electric motor of the rechargeable work vehicle can be started.

2. The work vehicle according to claim 1, wherein
when an elapsed time from start of charging the work vehicle is equal to or less than a predetermined time, the display control unit increases the brightness of the display unit that has a brightness reduced as compared with that during the operation of the work vehicle.

3. The work vehicle according to claim 1, wherein
when the charge of the work vehicle is completed, the display control unit increases the brightness of the display unit that has a brightness reduced as compared with that during the operation of the work vehicle.

4. The work vehicle according to claim 1, wherein
when an abnormality occurs in charging of the work vehicle, the display control unit increases the brightness of the display unit that has a brightness reduced as compared with that during the operation of the work vehicle.

5. The work vehicle according to claim 1, further comprising
an operation unit, wherein
when an operation is performed on the operation unit to reduce the brightness of the display unit, the display control unit reduces the brightness of the display unit.

6. The work vehicle according to claim 1, wherein
when an elapsed time from an operation on an operation unit is less than or equal to a predetermined time, the display control unit increases the brightness of the display unit that has a brightness reduced as compared with that during the operation of the work vehicle.

7. The work vehicle according to claim 1, wherein
the display unit displays operation information during the operation of the work vehicle, and
the operation information displayed on the display unit includes a service meter that indicates an accumulated operation time, operation information about a battery, and a hydraulic oil temperature.

8. The work vehicle according to claim 1, wherein
a time during charge of the work vehicle also includes a time in which a charging connector is connected to a charging inlet.

9. The work vehicle according to claim 1, wherein
the key switch is configured to be turned on so power can be supplied from an accessory battery of the rechargeable work vehicle and the key switch is configured to be further turned to a position different from an on-position so an electric motor of the rechargeable work vehicle can be started.

* * * * *